US008365628B2

(12) United States Patent
Islam et al.

(10) Patent No.: US 8,365,628 B2
(45) Date of Patent: Feb. 5, 2013

(54) METHODS OF MAKING TORQUE OVERLAY ACTUATORS

(75) Inventors: Mohammad S. Islam, Saginaw, MI (US); Christian E. Ross, Hemlock, MI (US); Matthew W. Mielke, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1266 days.

(21) Appl. No.: 12/142,169

(22) Filed: Jun. 19, 2008

(65) Prior Publication Data

US 2008/0314177 A1  Dec. 25, 2008

Related U.S. Application Data

(60) Provisional application No. 60/945,438, filed on Jun. 21, 2007.

(51) Int. Cl.
*F16H 35/00* (2006.01)
*B62D 1/16* (2006.01)
*G01L 3/00* (2006.01)
*B21D 53/28* (2006.01)
*H02K 1/06* (2006.01)

(52) U.S. Cl. ............ 74/388 PS; 74/492; 73/862.332; 73/862.334; 180/422; 324/207.21; 310/216.091; 310/216.092; 29/893.3

(58) Field of Classification Search ............... 74/388 PS, 74/492; 180/422; 73/862.332, 862.334; 324/207.21; 280/44, 46; 701/41–43; 310/216.091, 310/216.092; 29/893.3
See application file for complete search history.

(56) References Cited

U.S. PATENT DOCUMENTS

| | | | | |
|---|---|---|---|---|
| 5,878,492 | A * | 3/1999 | Gleasman et al. | 29/893.3 |
| 6,978,685 | B2 * | 12/2005 | Shiba et al. | 73/862.334 |
| 7,174,795 | B2 * | 2/2007 | Feng et al. | 73/862.332 |
| 2002/0130657 | A1 * | 9/2002 | Li | 324/207.21 |
| 2006/0249326 | A1 | 11/2006 | Birsching et al. | |
| 2008/0314164 | A1 * | 12/2008 | Masson et al. | 73/862.333 |
| 2009/0315424 | A1 * | 12/2009 | Vollmer | 310/156.43 |
| 2010/0147619 | A1 * | 6/2010 | Chandy et al. | 180/422 |
| 2011/0018384 | A1 * | 1/2011 | Kenjo et al. | 310/216.092 |
| 2011/0057533 | A1 * | 3/2011 | Murakami et al. | 310/156.43 |

* cited by examiner

*Primary Examiner* — Vinh Luong
(74) *Attorney, Agent, or Firm* — Cantor Colburn LLP

(57) ABSTRACT

A method for designing a pole piece for a power assist steering system, includes: selecting a number of teeth, k, for the pole piece where k=n/2 and n represents an even number of poles; and selecting a ratio between an angle made by an inner tooth tip and an outer tooth tip, $\theta_{tp}$, and an angle made by a magnet pole width, $\theta_{mp}$, to provide a desired torque function for the steering system.

19 Claims, 6 Drawing Sheets

METHODS OF MAKING TORQUE OVERLAY ACTUATORS

CROSS-REFERENCE TO RELATED APPLICATIONS

This application claims the benefit of U.S. Provisional Application No. 60/945,438, filed Jun. 21, 2007.

BACKGROUND OF INVENTION

1. Field of the Invention

This invention relates generally to vehicle steering devices, and more particularly, this invention relates to vehicle steering devices for controlling torque.

2. Description of the Related Art

In a motor vehicle, a pull condition can occur in which a driver of the vehicle has to input torque into the steering system in order to maintain a straight path. This condition can be caused by vehicle and road conditions and weather conditions such as a crosswind that require a force for the steering system to overcome, or by an imbalance in the steering system (such as if the valve is balanced in the null position and the torsion bar is on center but the valve spool is creating pressure in the system) which requires an input torque by the driver to correct. Various designs are known for controlling input torque. One design includes the use of cogs in steering mechanisms.

Cogging torque has significant influence on the output torque profile of torque overlay (TO) actuators. For example, due to interactions of a permanent magnet with teeth of a cog, cogging or detent torque is caused. Cogging torque can be minimized using conventional methods, such as by providing skew (in at least one of the permanent magnet and teeth of the cog), a dummy notch in each of the teeth or selected teeth, and by shifting of the permanent magnet or teeth. For a permanent magnet having a ring design, including skew is a simple design around.

What are needed are advancements in techniques for controlling cogging torque in a steering mechanism.

BRIEF DESCRIPTION OF THE INVENTION

A method for designing a pole piece for a power assist steering system, is disclosed and includes: selecting a number of teeth, k, for the pole piece where k=n/2 and n represents an even number of poles; and selecting a ratio between an angle made by an inner tooth tip and an outer tooth tip, $\theta_{tp}$, and an angle made by an effective magnet pole width, $\theta_{mp}$, to provide a desired torque function for the steering system.

DETAILED DESCRIPTION OF THE INVENTION

Aspects of a power assisted steering system are disclosed in U.S. Patent Application No. 2006/0249326 ('326), filed Nov. 9, 2006 and entitled "Steering System with Leads and Pulls Compensation." Aspects of the '326 application, as are consistent with the teachings herein, are incorporated into the disclosure herein.

Figure 1:
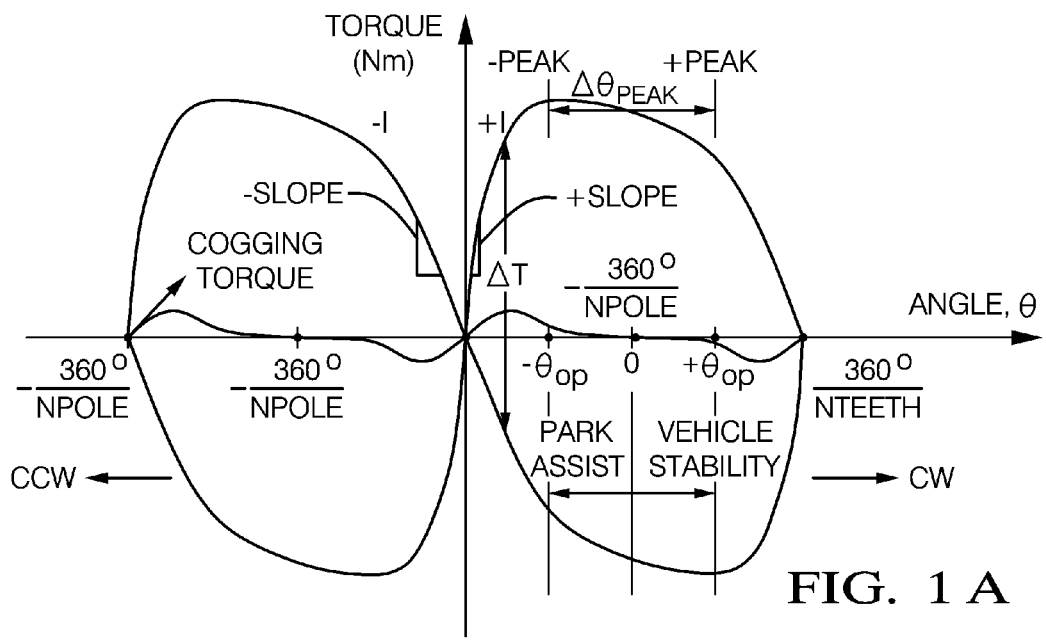
FIG. 1A and FIG. 1B, collectively referred to herein as FIG. 1, depict torque angle plots showing torque versus angle for a torque overlay (TO) actuator (FIG. 1A) and a variable effort steering (VES) actuator.
Figure 1:
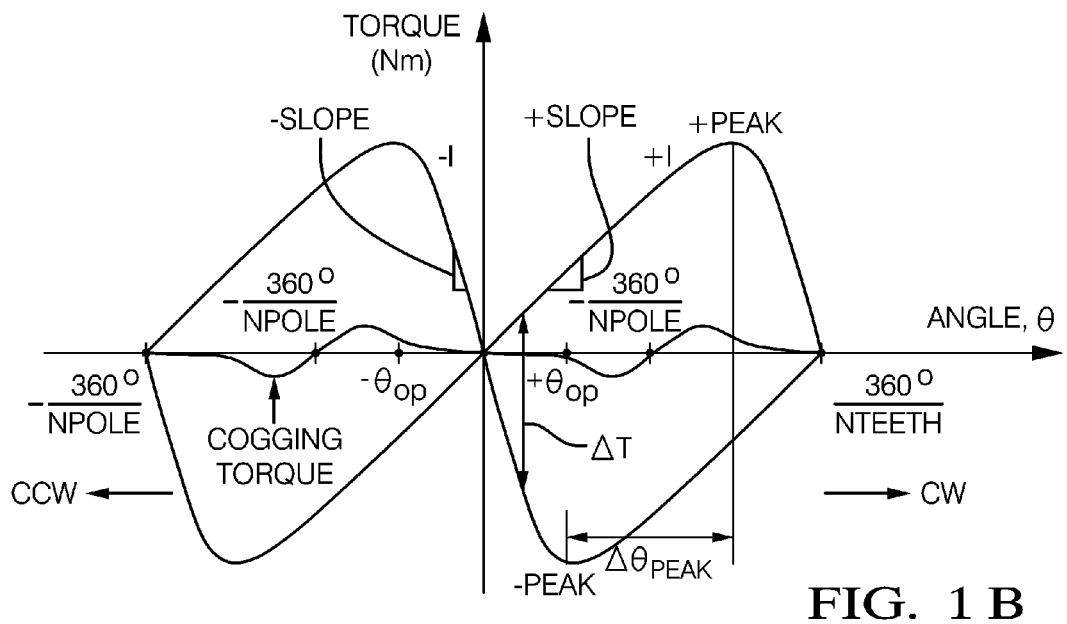

Referring now to FIG. 1A, a torque-angle plot is shown for an exemplary torque overlay (TO) actuator. In FIG. 1B, a torque-angle plot is shown for an exemplary variable effort steering (VES) actuator. In general, the hydraulic valves fully actuate at +/−4 degrees. The valve profile is given as pressure-angle and the actuator output is given as torque-angle. Combined, they generate an effort curve that is pressure-torque. The angular displacement is +/−4 degrees maximum which is denoted by +/−$\theta_{op}$ in the diagram. This range can typically vary from +/−1 to +/−8 degrees and depends on the pressure angle profile of the hydraulic valves.

As shown in FIG. 1A and FIG. 1B, a VES actuator can be clocked to operate as a TO actuator. In this case, cogging torque is not ideal in shape and does not provide full capability for park assist and vehicle stability. Within the operating range, the cogging torque is high, which is not desirable when no current fault condition happens. FIG. 1A and FIG. 1B shows the difference between desirable cogging torques in TO and VES actuators. The teachings herein define design bases for electromagnetic implementations used for obtaining the desired cogging torque for torque overly actuators in comparison to the variable effort steering actuators. Consider aspects of performance requirements for torque overlay actuators.

Referring to FIG. 1A, the following characteristics are desirable in TO actuator within the range of angular displacement of the hydraulic valves:

T vs. θ should be approximately constant within the range of travel +/−$\theta_{op}$ as shown in FIG. 1A (or slight slope);

+/− slope requirement becomes high if the torque profile does not exhibit a flat region;

$\Delta\theta_{peak}$ should be higher to obtain large ΔT at any position θ within the range of angular displacement;

Ideally, the +ve peak of +I torque should appear before the −ve peak of −I torque, which is opposite to that shown for VES. This characteristic provides more capability for park assist. This ROI is mainly to address how to achieve this particular shape.

As an example, cogging torque shown in FIG. 1A may be adequate for satisfying all of the characteristics mentioned above. Zero, or nearly zero, cogging torque is desirable within the operating range. This makes the curve for the torque flat or of a small slope. A nearly constant torque output also helps to reduce the controller burden to adjust current continuously to maintain the torque constant. Moving the cogging peaks from the symmetrical position helps to increase the peak torque at the corners. The cogging torque should be zero, or nearly zero, around the zero position of the torque overlay actuator for at least +/−2 degrees. Contrary to the zero position of the variable effort steering actuator, the torque overlay actuator has torque available with current at a zero position. This helps to meet the on center or around on center torque demand as needed and makes the torque flat or nearly constant.

Figure 2:
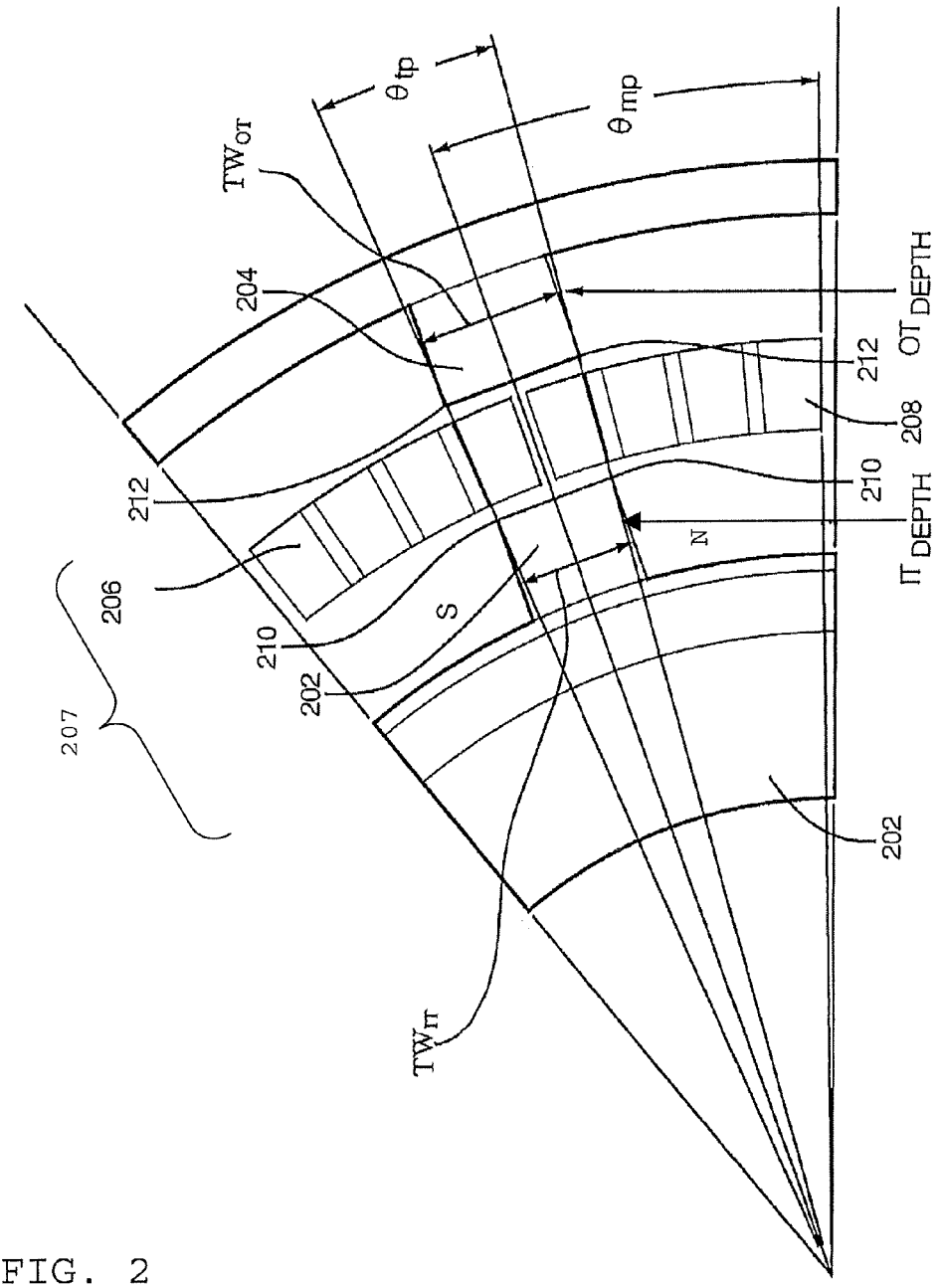
FIG. 2 depicts teeth and pole shaping for desired cogging torque for an 18-pole, 9-teeth an n/2 design.

FIG. 2 is a partially cut-away drawing of an exemplary embodiment of a torque overlay actuator illustrating characteristics and relationships of portions of the torque overlay actuator. The torque overlay actuator includes an inner tooth 202 having a tooth width ($TW_{IT}$), a tooth depth ($IT_{DEPTH}$), and corners 210. An outer tooth 204 includes a tooth width ($TW_{OT}$), a tooth depth ($OT_{DEPTH}$), and corners 212. A pole piece 207 is disposed between the inner tooth 202 and the outer tooth 204 and includes a first pole portion 206 and a second pole portion 208. An interpolar zone is partially defined by the first pole portion 206 and the second pole portion 208.

Tooth profiling may be performed to achieve the desired cogging shape in a manner similar to profiling for VES actuators. Shaping of magnetic poles may be used along with the other techniques. An important design parameter is the ratio between $\theta_{tp}/\theta_{mp}$, which is denoted here as Ratio_Ang. A relationship of $\theta_{tp}$ and $\theta_{mp}$ is shown in FIG. 2. Similar relationships may be shown for the angles at the root of the teeth. For any combination of teeth and poles, Ratio_Ang is the primary design parameter that guides the electromagnetic design for torque overlay or a variable effort steering actuator. One skilled in the art will recognize that controlling other parameters, such as dimensions of the interpolar zone, an inner tooth depth ($IT_{depth}$), an outer tooth depth ($OT_{depth}$), an inner tooth width ($TW_{IT}$), an outer tooth width ($TW_{OT}$), as well as other aspects, such as those discussed herein or known to those skilled in the art, may provide for improved torque control.

Figure 3:
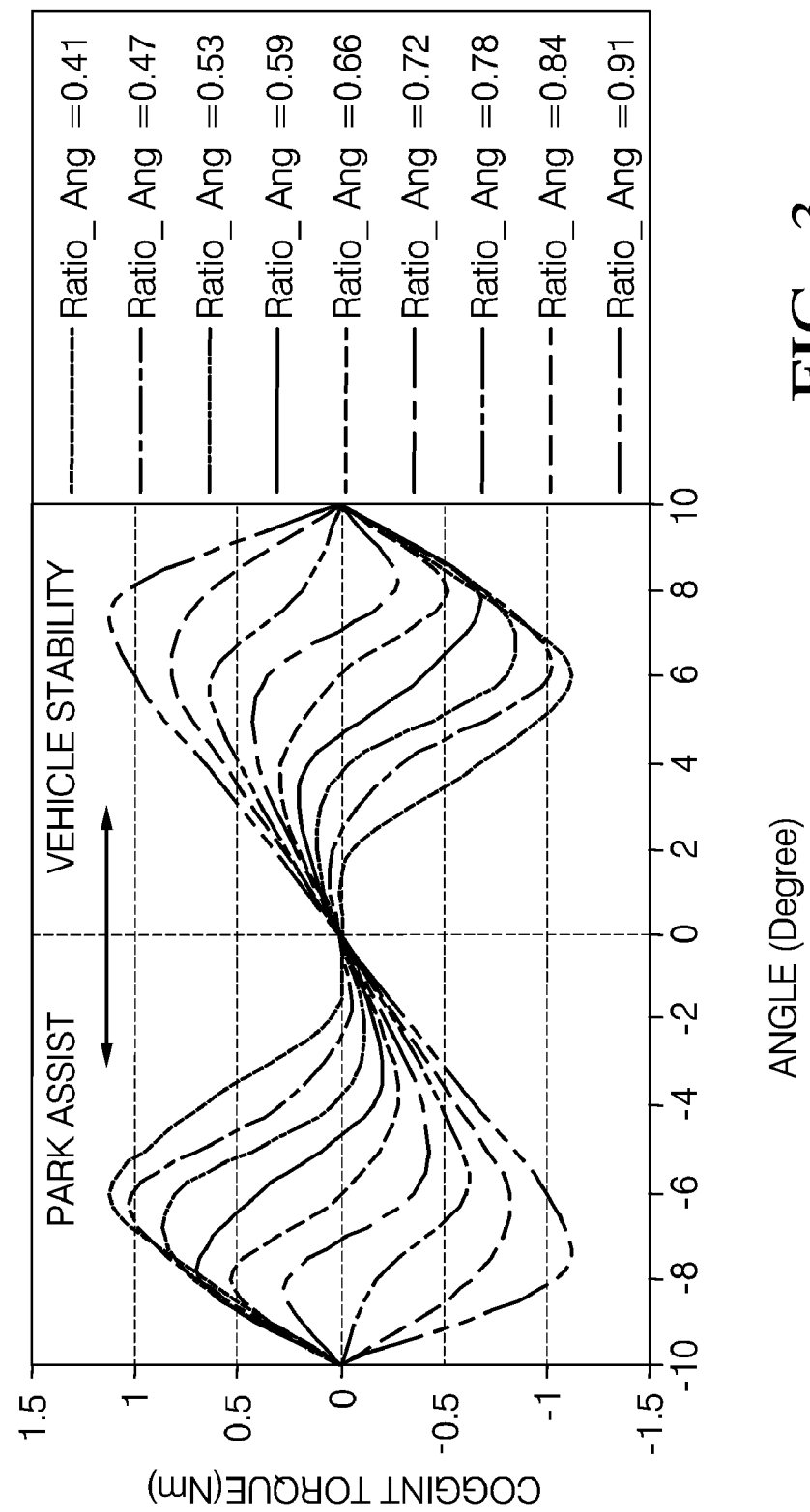
FIG. 3 depicts cogging torque variation as a function of varying Ratio_Ang.
Figure 4:
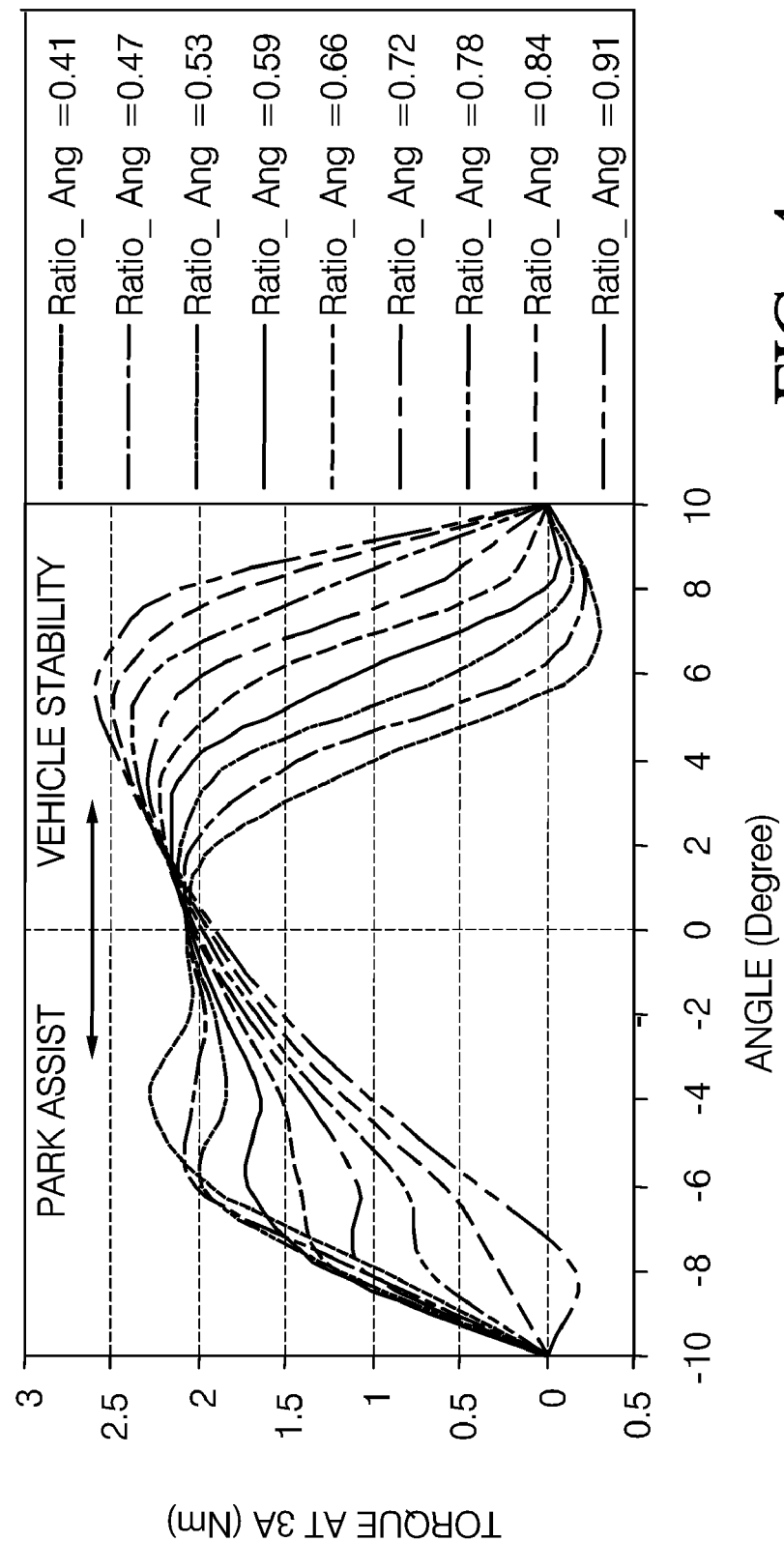
FIG. 4 depicts variation of torque as a function of varying Ratio_Ang.

Considering techniques for design of a pole piece 207 according to the teachings herein, a cogging torque profile may be determined. Cogging torque may be profiled by varying the design parameter Ratio_Ang as mentioned above. Both FIG. 3 and FIG. 4 show the zero degree as the zero position of the TO actuator. FIG. 3 shows how the cogging torque changes its shape and polarity by varying Ratio_Ang for a symmetric design. The primary parameters that influences the cogging torque significantly are:

$TW_{OT}$=Tooth width of outer tooth;
$TW_{IT}$=Tooth width of inner tooth;
$\theta_{tp}$=angle made by the inner and outer tooth tip; and
$\theta_{mp}$=effective magnet pole width.

In the above design, $\theta_{tp}$ determines the teeth width. $\theta_{mp}$ is determined primarily by the number of poles. The effective polar width is further defined by the magnetization fixture which defines its inter-polar zone. FIG. 3 shows the suitable designs for TO actuators when Ratio_Ang is around 0.5 as an example for 18-pole 9-teeth design. Designs variations can be made by putting emphasis on either park assist or vehicle stability regions and the Ratio_Ang can be selected as needed.

Fine tuning in the profile may be performed by putting corner radius on the tooth. The corner radius may be configured in any pattern. A non-limiting example is shown in FIG. 2 where the radius is present only in the inner side of the teeth pair. In some embodiments, the corners may be sharp. In other examples, the corners may include corner radius in both sides of the teeth or the inner side may have sharp and the outer side may have radius. The size of the radius can be adjusted to influence the cogging torque. Instead of radius, a tapered shape can also have similar effect on the cogging torque. The cogging torque also depends on the radial depth of the teeth.

Regardless of the tooth geometry, cogging torque also depends on the magnet strength, magnetization pattern and the airgap between magnet and teeth. The magnetization fixture can be used to control the magnet pole patterns. The magnets can be either radial oriented ring magnet or discrete arc or flat shaped (rectangular, square etc) magnets. For large number of poles, the ring magnet has an advantage of ease manufacturing. The inter-polar zone between each pole of the magnet can also be used to reshape the cogging torque.

The teeth can be grouped together with $\theta_{tp}$ adjusted to shape the cogging torque. The teeth can be grouped in 2 or 3 or even more depending on the number of teeth. For an example, 18-pole 9-teeth design can be grouped in 1 or 3 and a 30-pole 15-teeth design can be grouped in 3 or 5. In general, the grouping of multiple teeth is called n/4 or n/6 design where n is the number of poles. The design without any grouping is called n/2 design. The outer and inner tooth height and tooth width can be adjusted to reshape the cogging torque also.

Design of the pole piece 207 starts with determining k=n/2 number of teeth, where n is the number of poles and an even number. Review of various designs has shown that Ratio_Ang should be around 0.5 for best performing TO actuators, as it approximates the desired torque shape as shown in FIG. 1A. In this design, tooth width, tooth depth and corner radius are the additional options to further reshaping the cogging torque. Usually the cogging torque is high for these designs. The successful designs show the cogging torque peak to be outside the range of travel. FIG. 3 and FIG. 4 show the variation with respect to the parameter Ratio_Ang. It is possible to change the shape and polarity of cogging by using Ratio_Ang appropriately.

The n/4 design is a derivative of n/2 designs where grouping of multiple teeth is performed. Exemplary rules for forming the groups include:

If k is an even number then the number of teeth nt in a group can have a value in between 1 to k/2 and k has to be divisible by nt; and, If k is an odd number then the number of teeth nt in a group can only be odd in between 1 to k/2 and k has to be divisible by nt and nt is less than k/2.

As an example, consider an 18-pole 9-teeth design configured as described in Table 1.

TABLE 1

Exemplary 18-pole 9-teeth design

| Number of poles n | Number of teeth K = n/2 | Number of teeth in a group nt | Number of groups ng |
|---|---|---|---|
| 18 | 9 | 1 | 9 |
| 18 | 9 | 3 | 3 |

The above provides additional control parameters to shape the cogging torque. For example, the angular spacing among the teeth in each group as well as the angular spacing among different groups can be controlled to achieve the desired cogging shape. Tooth profiling within a group is still a design option. The embodiment is an 18-pole 9-teeth design where n equals 18 and k equals 9. As shown in Table 1, the teeth may be grouped together. Accordingly, the design guidelines presented herein for determining Ratio_Ang provided for improved control of cogging torque. An exemplary embodiment is depicted in FIG. 5.

Figure 5:
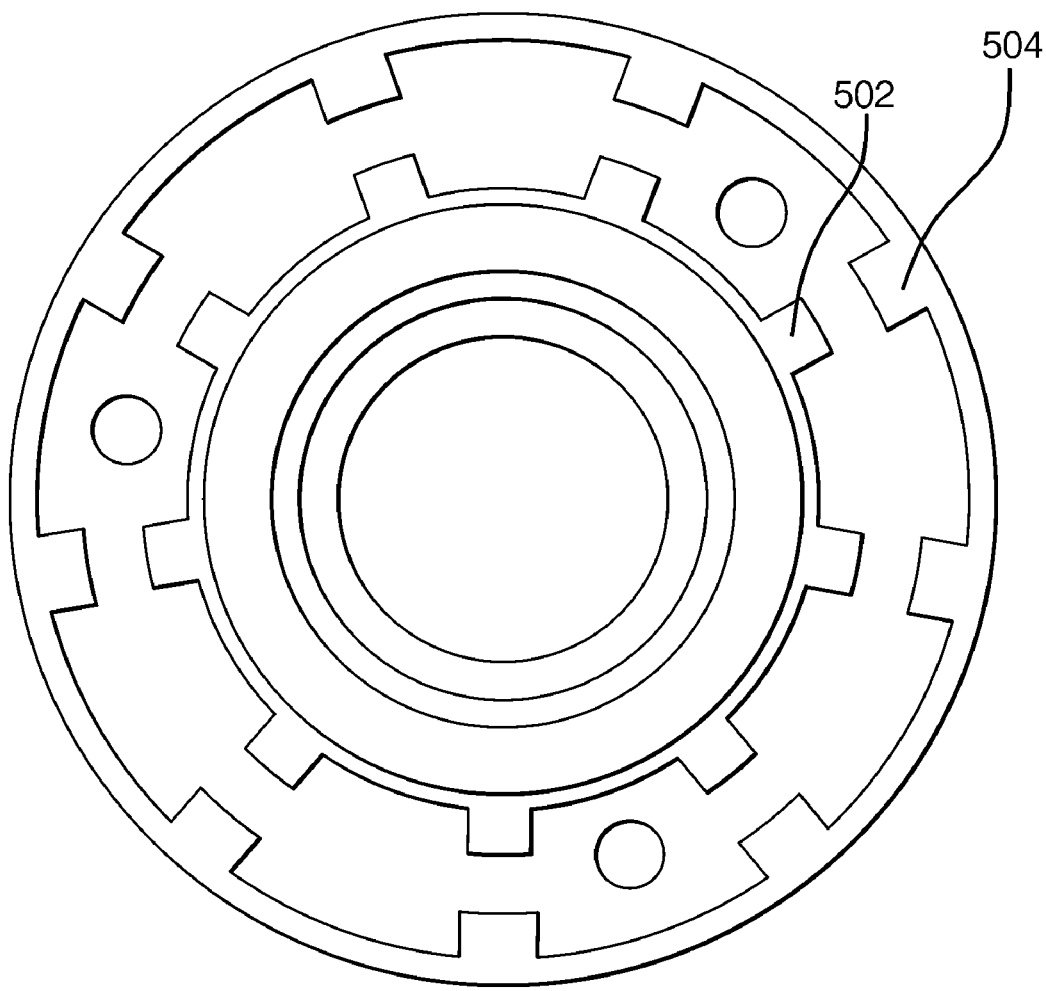
FIG. 5 depicts an exemplary embodiment of an 18-pole, 9-teeth design as an n/2 design.
Figure 6:
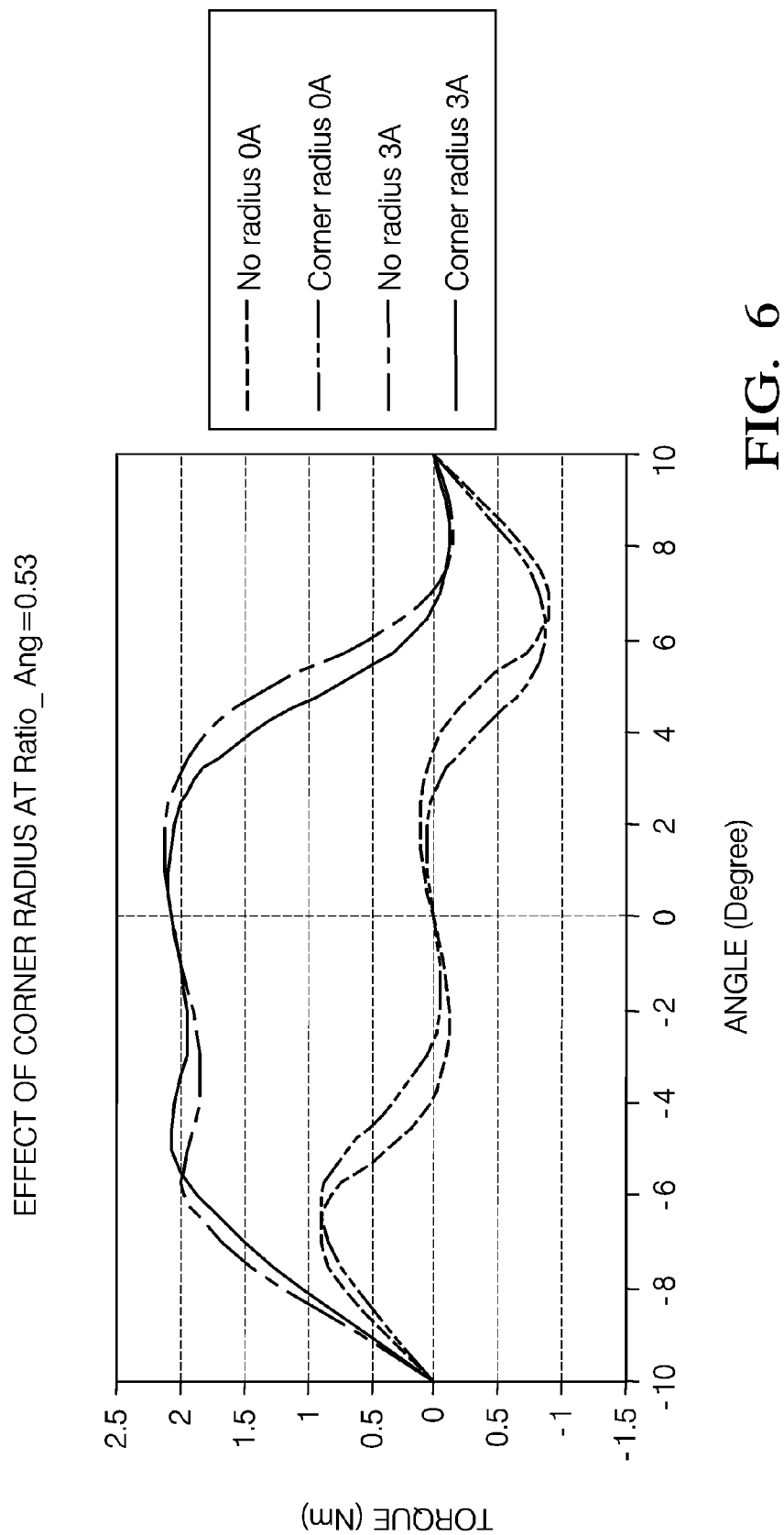
FIG. 6 depicts effects of corner radius on torque waveform at Ratio_Ang=0.53.

For the embodiment shown in FIG. 5, each tooth has radius in both corners for inner teeth 502 and outer teeth 504. FIG. 6 shows the effect of corner radius on torque and cogging torque. Corner radius or tapering may also be used for profiling the torque waveform.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims, the extent of the disclosure provided herein, and the knowledge of those skilled in the art.

What is claimed is:

1. A method for designing a pole piece for a power assist steering system, the method comprising:
    selecting a number of inner teeth and outer teeth, k, for the pole piece where k=n/2 and n represents an even number of poles; and
    selecting a ratio between an angle made by an inner tooth tip and an outer tooth tip, $\theta_{tp}$, and an angle made by a magnet pole width, $\theta_{mp}$, to provide a desired torque function for the steering system.

2. The method of claim 1, wherein the ratio is between 0.4 and 0.5.

3. The method of claim 1, wherein the ratio is between 0.5 and 0.72.

4. The method of claim 1, wherein the method further comprises selecting a radius of a corner of the inner tooth to provide the desired torque function for the steering system.

5. The method of claim 1, wherein the method further comprises selecting a radius of a corner of the outer tooth to provide the desired torque function for the steering system.

6. The method of claim 1, wherein the method further comprises selecting a dimension of the width of the inner tooth to provide the desired torque function for the steering system.

7. The method of claim 1, wherein the method further comprises selecting a dimension of the width of the outer tooth to provide the desired torque function for the steering system.

8. The method of claim 1, wherein the method further comprises selecting a dimension of the depth of the inner tooth to provide the desired torque function for the steering system.

9. The method of claim 1, wherein the method further comprises selecting a dimension of the depth of the outer tooth to provide the desired torque function for the steering system.

10. The method of claim 1, wherein the method further comprises selecting a dimension of an inner polar zone partially defined by a first pole portion and a second pole portion of the pole piece to provide the desired torque function for the steering system.

11. A method for designing a pole piece for a power assist steering system, the method comprising:
    selecting a number of inner teeth and outer teeth, k, for the pole piece where k=n/2 and n represents an even number of poles; and
    selecting a number of inner teeth and outer teeth in a group of inner teeth and outer teeth, nt, wherein nt equals 1 to k/2 if k is an even number and nt equals an odd number between 1 to k/2 if k is an even number;
    selecting a ratio between an angle made by an inner tooth tip and an outer tooth tip, $\theta_{tp}$, and an angle made by a magnet pole width, $\theta_{mp}$, to provide a desired torque function for the steering system.

12. The method of claim 11, wherein nt equals 1 to k/2 if k is an even number and nt equals an odd number between 1 to k/2 if k is an odd number.

13. The method of claim 11, wherein the method further comprises selecting a radius of a corner of the inner tooth to provide the desired torque function for the steering system.

14. The method of claim 11, wherein the method further comprises selecting a radius of a corner of the outer tooth to provide the desired torque function for the steering system.

15. The method of claim 11, wherein the method further comprises selecting a dimension of the width of the inner tooth to provide the desired torque function for the steering system.

16. The method of claim 11, wherein the method further comprises selecting a dimension of the width of the outer tooth to provide the desired torque function for the steering system.

17. The method of claim 11, wherein the method further comprises selecting a dimension of the depth of the inner tooth to provide the desired torque function for the steering system.

18. The method of claim 11, wherein the method further comprises selecting a dimension of the depth of the outer tooth to provide the desired torque function for the steering system.

19. The method of claim 11, wherein the method further comprises selecting a dimension of an inner polar zone partially defined by a first pole portion and a second pole portion of the pole piece to provide the desired torque function for the steering system.

* * * * *